Sept. 13, 1949.  B. R. SCHNEIDER  2,481,881
LIGHT ATTACHMENT FOR FISHING POLES
Filed Oct. 28, 1947  2 Sheets-Sheet 1
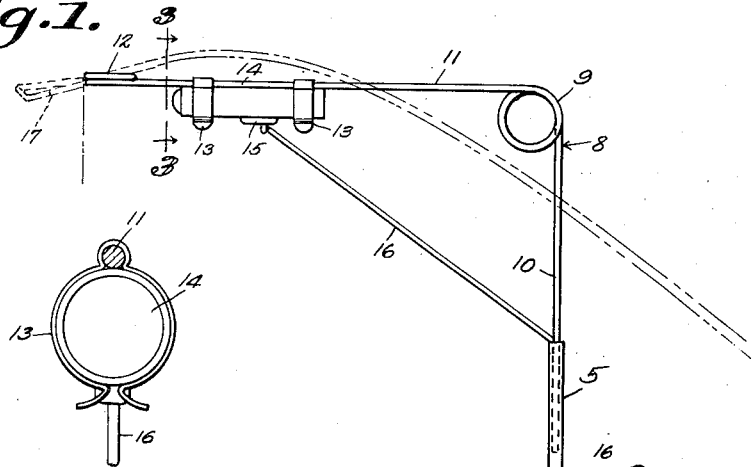
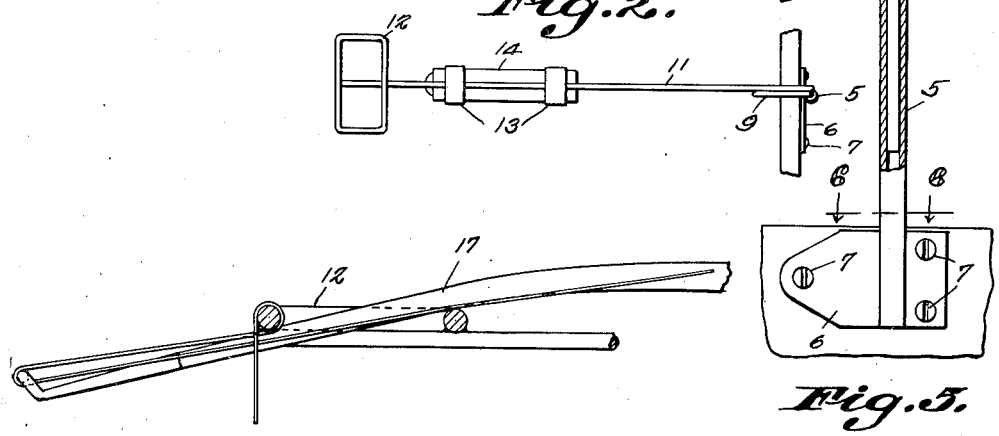
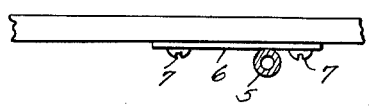
B. R. Schneider
INVENTOR
BY C. A. Snow & Co.
ATTORNEYS.

Sept. 13, 1949.   B. R. SCHNEIDER   2,481,881
LIGHT ATTACHMENT FOR FISHING POLES
Filed Oct. 28, 1947   2 Sheets-Sheet 2
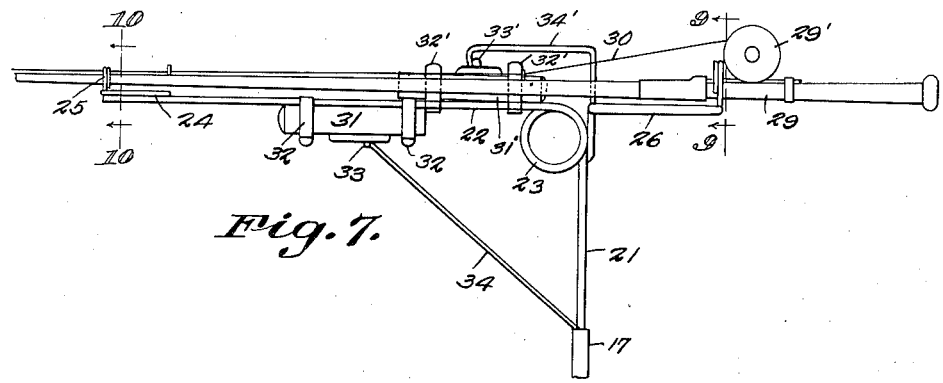
Fig. 7.
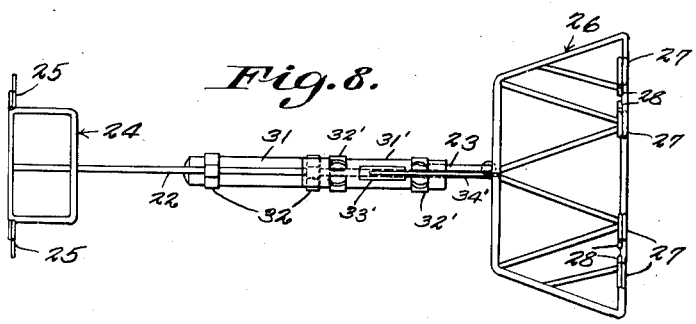
Fig. 8.
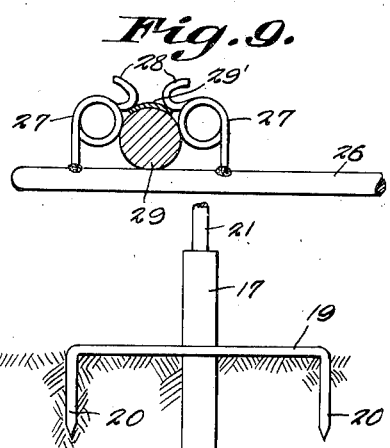
Fig. 9.
Fig. 10.
Fig. 11.
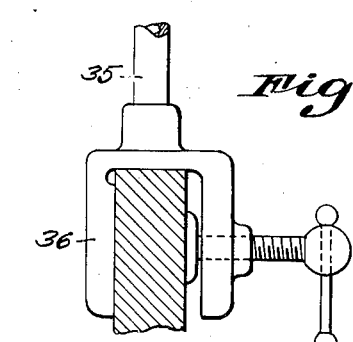
Fig. 12.
B. R. Schneider
INVENTOR
BY *Catnow Leo.*
ATTORNEYS.

Patented Sept. 13, 1949

2,481,881

UNITED STATES PATENT OFFICE 2,481,881

LIGHT ATTACHMENT FOR FISHING POLES

Ben Ralph Schneider, Nicoma Park, Okla.

Application October 28, 1947, Serial No. 782,581

5 Claims. (Cl. 43—17)

This invention relates to light attachment for fishing poles, designed for night fishing, the primary object of the invention being to provide a support for a fishing pole, an electric flash light positioned on the fishing pole, and connecting means between the fishing pole support and light switch, to cause the circuit to be completed to the light, causing the light to flash, indicating a strike when the outer end of the pole moves downwardly.

An important object of the invention is to provide a device of this character on which a fishing pole may be readily and easily positioned, without the necessity of making alterations in the fishing pole, to mount the device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of a fishing rod and light support, constructed in accordance with the invention, the support including a socket member secured to the gunwale of a boat.

Figure 2 is a plan view thereof.

Figure 3 is a sectional view taken on line 3—3 of Figure 1.

Figure 4 is an enlarged side elevational view of the outer end of the support illustrating a fishing rod as positioned therein.

Figure 5 is an elevational view of the socket member of the support, partly in section.

Figure 6 is a sectional view taken on line 6—6 of Figure 5.

Figure 7 is a side elevational view of a modified form of the invention.

Figure 8 is a plan view thereof.

Figure 9 is a sectional view taken on line 9—9 of Figure 7.

Figure 10 is a sectional view taken on line 10—10 of Figure 7.

Figure 11 is a view illustrating the manner of securing the supporting tube in the ground surface.

Figure 12 is an elevational view illustrating the device as provided with a clamp for clamping over the gunwale of a boat.

Referring to the drawing in detail, the device comprises a tubular body portion or socket 5, which is secured to the plate 6 at the lower end of the body portion, the plate 6 being designed to fit against the gunwale of a boat where it is secured in position by means of the screws 7.

The device also includes the main supporting section 8 which is constructed preferably of a length of yieldable wire material bent intermediate its ends to provide a coil 9, a vertical supporting arm 10 and a horizontal supporting arm 11, the arm 11 extending at right angles with respect to the supporting arm 10.

Mounted on the upper end of the horizontal supporting arm 11 is a rectangular loop 12, the connection between the arm 11 and loop 12 being made at a point intermediate the ends of the loop 12, as shown by the drawing.

Secured to the horizontal supporting arm 11 at a point midway its ends, are spaced yieldable clips 13 which provide a support and means of attaching the flash light 14 to the arm 11 in such a way that a flash light will be firmly held against movement with respect to the arm 11.

Connected with the switch 15 of the flash light 14, is the rod 16, which has its opposite end secured to the vertical supporting arm 10 at a point adjacent to the upper end of the tubular body portion or socket 5. This rod 16 not only provides a means for actuating the switch 15, but at the same time provides a stop to limit the movement of the vertical supporting arm 10, within the socket member 5.

The end of the fishing rod used with this support is indicated by the reference character 17 and as shown, in operation, the end of the fishing rod is extended through the loop 12 in a manner as illustrated by Figure 4, the fishing rod passing over one of the side bars of the loop. With the fishing pole positioned in this manner, it is obvious that when a fish makes a strike, the outer end of the flexible arm 11 will move downwardly in the arc of a circle, to the end that the rod 16 will operate to move the switch 15 causing a light to be directed outwardly over the water giving a signal to the fisherman, of the strike, and at the same time illuminating the line so that the fisherman can follow the line and manipulate the pole to catch the fish.

It might be further stated that because of the construction of the rectangular loop the fishing pole may be readily positioned.

In the form of the invention as shown by Figure 7 of the drawings, the device is shown as constructed for supporting a pair of fishing rods, the support being such that the fishing rods will be normally held in horizontal planes.

In this type of support the device is designed for use in fishing from a bank, and comprises a tubular member 17 which has its lower end pointed as at 18, the tubular member 17 being braced in its upright position by means of the anchor 19 that includes a plate secured to the tubular member 17, the plate having downwardly extended ends 20.

As shown, the support comprises a length of heavy wire material bent intermediate its ends, providing a vertical arm 21 and a horizontal arm 22 connected by a yieldable loop member 23, whereby the horizontal arm may move vertically with respect to the arm 21.

At the outer end of the horizontal arm 22 is the rectangular loop 24 which is provided at its outer forward corners with yieldable hooks 25 that provide rests for the fishing rods supported by the device.

Rigidly secured to the inner end of the support at the upper end of the vertical arm 21, is the main fishing rod support, which is in the form of a substantially rectangular frame 26 that is of a length to extend appreciable distances from the horizontal arm 22. This main fishing rod support 26 is provided with yieldable arms 27 arranged in pairs, the free ends thereof being curved outwardly as at 28, so that a fishing rod such as indicated at 29, may be positioned therebetween and held against movement with respect to the support, the fishing rod being positioned between the yieldable arms at points adjacent to the reel and handle of the fishing rod, as clearly shown by the drawings.

The reference character 29' indicates the reel on which the fishing line 30 is wound, the fishing line passing through the usual line guides of the rod which extends upwardly from the fishing pole in its supporting position to insure against the line tangling as it is being unreeled.

The reference character 31 indicates a flash light which is secured to the under surface of the horizontal arm 22 by means of the spring clips 32, the flash light being provided with the usual switch 33 to which the actuating rod 34 is connected, the actuating rod also being welded to the vertical arm 21 to provide a stop limiting the downward movement of the vertical arm 21 into the tubular member 17.

Also secured to the horizontal arm 22 and extending upwardly therefrom, are clips 32' in which the flash light 31' is removably held. The reference character 33' indicates the usual flash light switch to which the arm 34' is connected in such a way that when the arm 22 moves downwardly under the action of a fish endeavoring to remove the bait, with the result that the switch is operated to cause the flash light to direct light rays towards the fisherman to direct his attention.

It will be noted that the arm 34' is secured to the vertical arm 21 at a point adjacent to the loop member 23 thereof.

In this form of the invention, as in the preferred form, it will be seen that when a strike occurs, the outer ends of the rods will move downwardly causing the actuating rod 34 to move the switch 33, lighting the flash lights, signaling to the fisherman and at the same time illuminating the line.

As shown by Figure 12 of the drawings, the tubular member indicated by the reference character 35, and in which the arm 21 of the operator is positioned, is secured to the clamp 36, which may be clamped to the gunwale of a boat should it be desired to use the support when fishing from a boat.

From the foregoing it is believed that due to the construction shown and described, the construction and operation of the support will be obvious, and that a further disclosure as to the construction and operation is unnecessary.

Having thus described the invention, what is claimed is:

1. A device comprising a tubular member, a supporting member including a length of yieldable wire material positioned in the tubular member and being bent intermediate its ends providing a vertical supporting arm, a horizontal arm, and a yieldable loop connecting the arms, a rectangular loop secured to the outer end of the horizontal arm through which a fishing rod is adapted to extend, a flash light having a switch supported on the horizontal arm, a rod connected to the switch and having connection with the vertical supporting arm whereby downward movement of the fishing rod moves the horizontal arm downwardly, operating the switch lighting the flash light.

2. A device comprising a tubular member adapted to be secured to a support, a supporting member including a length of yieldable wire material constructed to provide a vertical supporting arm extended into the tubular member to hold the supporting arm in an upright position, a horizontal arm formed integral with the vertical arm, a horizontal loop member secured to the horizontal arm at the end thereof and through which a fishing pole is adapted to extend to support the fishing pole, a flash light having a switch secured to the horizontal arm, a rod connected with the switch member and having connection with the vertical arm whereby downward movement of the horizontal arm operates the switch member causing the flash light to be illuminated.

3. A device comprising a tubular member, a fishing rod support including a vertical arm adapted to be fitted in the tubular member and an arm extending at right angles with respect to the vertical arm, a yieldable loop connecting the arms, a loop supported at the outer end of the second mentioned arm and through which a fishing rod is adapted to extend and to be held, a flash light having a switch secured to the second named arm, and switch actuating means connected with the switch and movable with the downward movement of the latter arm for lighting the flash light.

4. A device comprising a tubular member adapted for positioning on a supporting surface, a supporting member including a vertical arm positioned within the tubular member, a loop formed at the upper end of the vertical arm, a horizontal arm forming a part of the loop, fishing pole securing means at the outer end of the horizontal arm, a flash light having a switch secured to the horizontal arm, and a switch actuating rod disposed between the switch and vertical arm for operating the switch for lighting the flash light when the horizontal arm moves downwardly by the action of a fish jumping to remove bait from the fishing line connected with the fishing pole.

5. A device comprising a tubular member, a yieldable arm extended into the tubular member and including a right-angled section having an eye at the free end thereof through which a fishing pole having a line secured thereto is extended, a flash light secured to the right-angled section, said flash light having a switch, and a rod connected with the switch and yieldable arm whereby downward movement of the right-angled section operates the switch lighting the flash light.

BEN RALPH SCHNEIDER.

REFERENCES CITED

The following references are of record in the file of this patent:

UNITED STATES PATENTS

| Number | Name | Date |
| --- | --- | --- |
| 916,891 | Schildbach | Mar. 30, 1909 |
| 2,195,692 | Bushey | Apr. 2, 1940 |
| 2,032,537 | Kozikowski | Mar. 3, 1936 |